Dec. 13, 1966  R. NAYLOR ET AL  3,292,113
ELECTROMAGNETIC TRANSDUCERS
Filed April 5, 1963  2 Sheets-Sheet 1
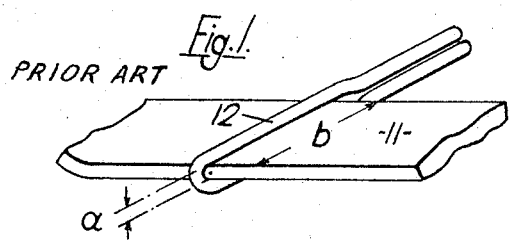
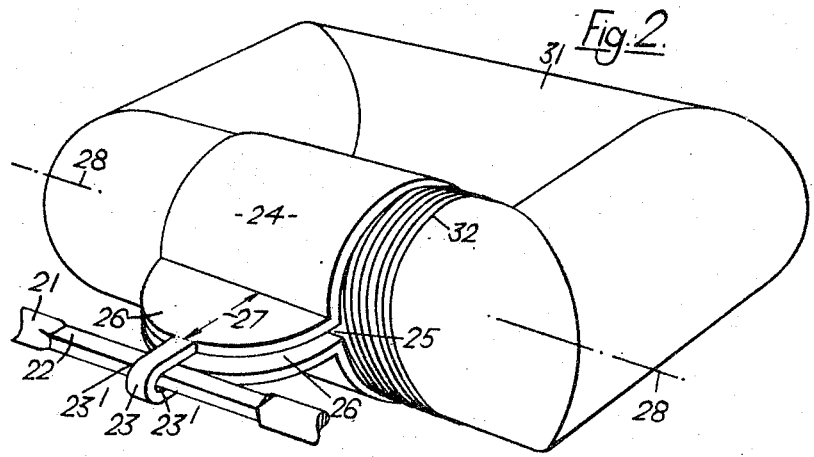
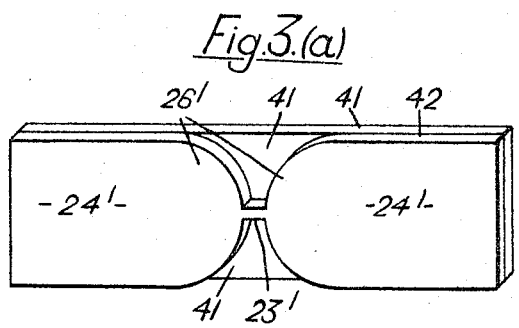
Inventors
R. NAYLOR
G. G. SCARROTT
By
Cameron, Kerkam + Sutton
Attorneys Dec. 13, 1966   R. NAYLOR ET AL   3,292,113
ELECTROMAGNETIC TRANSDUCERS
Filed April 5, 1963   2 Sheets-Sheet 2
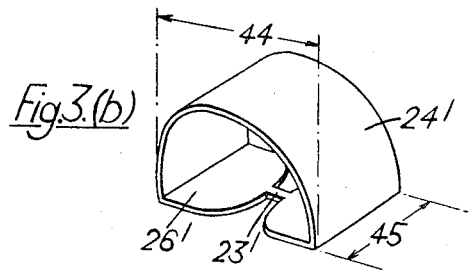
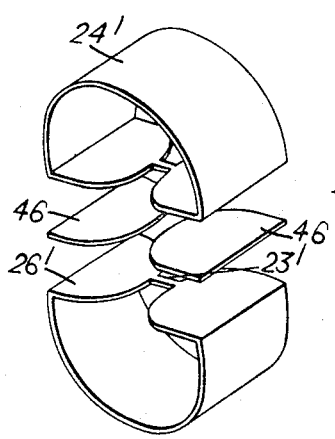
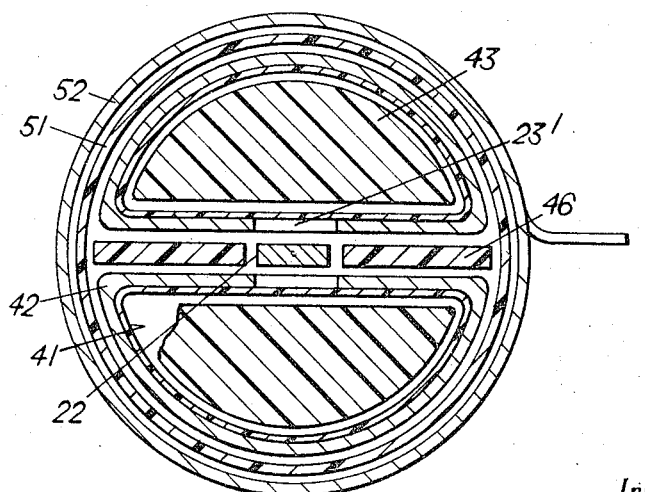
Inventors
R. NAYLOR
G. G. SCARROTT
By
Cameron, Kerkam & Sutton
Attorneys United States Patent Office 3,292,113
Patented Dec. 13, 1966

3,292,113
ELECTROMAGNETIC TRANSDUCERS
Ronald Naylor, Cheadle Hulme, Cheadle, and Gordon G. Scarrott, Wokingham, England, assignors to Ferranti, Limited, Hollinwood, England, a company of Great Britain and Northern Ireland
Filed Apr. 5, 1963, Ser. No. 270,977
Claims priority, application Great Britain, Apr. 5, 1962, 13,082/62
6 Claims. (Cl. 333—30)

This invention relates to electromagnetic transducers and specifically to transducers units, comprising the transducer itself and an energising transformer, for magnetostrictive delay-lines of the kind in which the signal is launched and detected in the longitudinal mode, in particular for storing the digit-representing pulses of a computer.

To attain the highest practiable pulse rate such a delay line should be in the form of a wire, preferably of nickel, of circular section and very small gauge. It is customary to flatten the wire in the vicinity of the transducer to the form of a ribbon 11, see FIG. 1 of the accompanying drawings, and use for the transducer a single-turn coil or looped 12 correspondingly flattened to embrace the ribbon with narrow clearances. With such a known arrangement the resolution of the system is inversely dependent on the smaller dimension $a$ of the loop (approximately the thickness of the ribbon 11), whilst the signal level is directly dependent on the larger dimension $b$ (approximately the width of the ribbon). It is for this and other reasons that the wire of the delay line is flattened to ribbon form at the transducer. Typical values met with in practice are 0.001" for dimension $a$ and from 0.005" to 0.010" for dimension $b$.

Usually such a transducer is fed by a transformer; the combination of the two, including of course the connections between them, will hereinafter be referred to for convenience by the expression transducer unit, already used in that sense above. To minimise leakage inductance the secondary winding of the transformer should be in the form of a single loop of strip material of as great a breadth as is practicable; the primary may be a single layer of a conventional helical winding; in either case the two windings should be spaced as closely together as insulation requirements permit. The difficulty then arises of how to connect the ends of such a secondary, of broad strip material, to the very much smaller ends of the transducer loop whilst still keeping the leakage inductance to tolerable limits compared with the useful load inductance.

An object of the invention is accordingly to provide a transducer unit for a delay-line of the kind described in which the difficulty just referred to is to some extent overcome.

In accordance with the present invention, an electro-magnetic transducer unit for a magnetostrictive delay-line to carry signals in the longitudinal mode, the line being of ribbon form in the vicinity of the unit, includes two comparatively narrow flatttened conductive transducer elements spaced apart to allow the ribbon of the delay-line to pass transversely between them with its broader surfaces closely parallel to the broader surfaces of those elements, two comparatively broad transformer secondary components each formed by a half-loop of strip material disposed so that the two define together a cylinder the diameter of which is approximately equal to the breadth of each strip and the axis of which is parallel to the direction of the delay-line in the vicinity of the unit, a pair of closely-parallel planar connections joining the ends of the transducer elements on one side of the delay-line to ends adjacent to one another of the secondary components, each to each, over a transitional region of length approximately equal to half the breadth of said strip material, these connections being shaped at their edges for smoothly converging the sectional dimensions of said ends of the secondary components to the sectional dimensions of said ends of the transducer elements, a primary winding closely coupled inductively to the two secondary components, and secondary-circuit completion connections so applied to the other ends of the transducer elements and the other ends of the secondary components as to allow the primary winding to energise in respect of each transducer element a secondary circuit to cause that element to carry a current which at any given moment flows transversely to the delay-line in the opposite direction to the current carried by the other element at that moment, thereby providing the effect of of an energised transducer loop.

The axis of said cylinder may be displaced from the delay-line and said completion connections include a direct connection between said other ends of the transducer elements, thereby causing them to form a transducer loop, and a direct connection between said other ends of the secondary components, thereby causing them to form a secondary loop in series with the transducer loop.

Alternatively, the axis of said cylinder may be coincident with the delay-line in the vicinity of the unit and said completion connections include a further pair of closely-parallel planar connection similar to said first-mentioned pair but joining said other ends of the transducer elements to said other ends of the secondary components, each to each, over a further transitional region similar to said first-mentioned region, thereby causing each secondary component to form a secondary half-loop in series with one of the transducer elements.

In the accompanying drawings, which are to an enlarged scale,
FIGURE 1 shows a known kind of transducer,
FIGURE 2 is a drawing in perspective of a transducer unit in accordance with one embodiment of the invention,
FIGURES 3a, 3b and 3c show the stages of constructing a transducer unit in accordance with another embodiment, and
FIGURE 4 is a section through the completed transducer unit of FIGURE 3.

In carrying out the invention in accordance with one form by way of example, see FIG. 2, an electromagnetic transducer unit for a magnetostrictive delay-line 21 to carry signals in the longitudinal mode, the line being of nickel wire flattened at 22 into ribbon form, includes the transducer itself in the form of a flattened or ribbon-like single-turn conductive loop 23 formed of parallel elements or limbs 23[1] the ends of which on one side of the line are joined by a direct connection. These elements are spaced apart to allow the ribbon portion of the line to pass transversely between them with its broader surfaces closely parallel to those of the transducer elements.

The transducer is driven by a transformer the secondary winding of which is in the form of an open-ended cylindrical loop 24 of strip material, which is broad compared with the width of the transducer elements. The cylinder which is thus defined has a diameter which is approximately equal to the width of the strip; the axis 28 of the cylinder is parallel to the direction of the delay-line in the vicinity of the unit but is displaced from it. The loop is interrupted by a slit 25, running parallel to axis 28, to form the ends of this secondary loop. The width of the slit and hence the distance between the ends of the loop is approximately equal to the distance between those ends of the transducer loop 23 which are not connected directly together. To those ends of loop 23 are joined the ends of secondary loop 24, each to each, by a pair of strip connections 26 which are closely parallel to one another at the above-mentioned equal distances of separation of the ends of the respective loops. These connections 26 are shaped at the edges so as to converge the sectional dimensions of the ends of loop 24 smoothly to those of the ends of loop 23. The distance 27 of the transitional region thus formed is approximately half the width of the strip material of loop 24. These transitional connections accordingly connect the secondary loop in series with the transducer loop.

Secondary loop 24 may be wound on a limb of a ferrite core 31. The core also carries the primary winding 32, in the form of a single-layer helix wound underneath loop 24 and closely coupled inductively to it to ensure minimum leakage inductance between them.

It is found that with the relative dimensions as stated, and with the edges of connections 26 smoothly convergent as described, the overall leakage inductance of the unit is substantially minimized. Though this leakage inductance may nevertheless be greater than the useful load inductance the disparity is not excessive. The ideal shape of convergence of the edges of connections 26 is roughly curvilinear, as depicted, so as to bring the filamentary current paths from the wide strip of loop 24 to the narrow strip of loop 23 without abruptly crowding them at any point.

Because of the very small size of transducer loop 23 the arrangement just described, though theoretically sound, does not readily admit of economic manufacture in robust form with close tolerances. A more convenient arrangement from this point of view, which may make use of photo-etching techniques as commonly employed in the manufacture of very small patterns in metal, will now be described with reference to FIG. 3.

The basic modification from the arrangement of FIG. 2 is that the elements $23^1$ of transducer loop 23 are now electrically separate, each energised by a secondary component individual to it. Each such secondary component is in the form of a half loop of the strip material, the two being disposed so as again to define a cylinder of diameter approximately equal to the strip width; in the present arrangement, however, the axis of the cylinder is coincident with the delay-line in the vicinity of the unit. The ends of each transducer element $23^1$ are connected to the corresponding ends of the associated secondary component by transitional strip connections similar to those described with reference to FIG. 2. The two series combinations of secondary component and transducer element are assembled with a common primary winding so that, as before, the two transducer elements $23^1$ pass closely parallel to one another one each side of and transversely to the ribbon part of the delay-line, thereby forming an electrical equivalent of the transducer loop 23 of FIG. 2.

As a first step in the manufacture, two pieces of thin flexible plastic material 41—see FIG. 3(a)—coated with a thin layer of copper 42 are photo-etched so that the copper layer assumes the shape depicted in FIG. 3(a), where the components which eventually form the equivalents of secondary 24 and connections 26 are indicated by those references primed; the copper portion which joins them is one of the eventual transducer elements $23^1$, and is therefore indicated by that reference. To strengthen its support of element $23^1$, the plastic material 41 is not constricted likewise but is made rectangular, as shown.

As shown in FIG. 3(b), each piece thus prepared is folded, with the plastic layer 41 (omitted from FIGS. 3(b) and 3(c) for clarity) inwards, round a former of insulation 43 (FIG. 4) of solid semi-cylindrical shape—that is, the approximate shape of one half of a solid cylinder bisected by a plane containing its axis, the diameter 44 of the cylinder being approximately equal to the width 45 of the strip portion $24^1$ forming the eventual secondary. Each secondary component is thus in the form of a hollow semi-cylindrical half-loop of strip material $24^1$, with the ends of the half-loop joined, parallel to the common diametral plane defined by the ends of the half-loops, by coplanar transition strip connections $26^1$ and the associated coplanar element $23^1$ of the transducer. Thus each secondary component, the associated transducer element, and the transitional connections between them are formed in one piece by the coating and etching process described above.

As shown in FIG. 3(c), in exploded form, the two combinations of secondary component and transducer element are assembled with spacers 46 of insulation between the respective strip connections $26^1$ to provide the necessary extent of separation between the transducer elements $23^1$ to allow the ribbon portion of the delay-line to pass transversely between them with narrow clearances.

The assembly, with the primary added, will be apparent from FIG. 4, which shows the complete transducer unit as a section taken just sufficiently in front of the medial plane to show the transducer elements $23^1$ in elevation rather than in section. The drawing is of course to a considerably enlarged scale, and, for the sake of clarity, certain of the components are shown as separated by spaces which do not in fact exist. To the components already enumerated are added a band of insulation 51 surrounding the two secondary half-loop components, which, as already stated approximately define a cylinder, and, surrounding this insulation, the primary winding 52, now in the form of a single helical layer, preferably of flat wire, closely wound. The drawing shows the ribbon portion 22 of the delay-line passing transversely between the transducer elements $23^1$ with the broader surfaces of the ribbon closely parallel to the broader surfaces of those elements. The surfaces of elements $23^1$ which face the delay-line may be coated with a thin layer of insulation (not shown) to prevent electrical contact. This layer may in each case be carried round the secondary loop, to insulate it from the primary, thereby obviating the need for the insulation band 51. Alternatively, the folding shown in FIG. 3(b) may be done with the plastic side outwards, to provide this insulation.

It will be appreciated that, as already indicated, the embodiment just described is to a first approximation the electrical equivalent of that of FIG. 2, the single loop of the transducer of FIG. 2 being replaced by two parallel conductors—the transducer elements $23^1$—carrying current in opposite directions as induced in the two secondary component windings from the common primary. In the present arrangement, however, the transformer has an air core rather than the ferrite core 31 of FIG. 2. A ferrite core has the advantage of allowing greater compactness for a given mutual inductance, but as an object of the invention is to facilitate manufacture such compactness of the transformer is not required.

The use again of transitional connections $26^1$ to converge the ends of the secondaries smoothly to the much smaller ends of the transducer elements assists in the reduction of the leakage inductance to tolerable limits.

The embodiment of FIGS. 3 and 4 may alternatively be considered as that of FIG. 2 but modified in that the ends of the transducer elements $23^1$ which in FIG. 2 are connected directly together are instead connected to corresponding ends of two secondary half-loops, each to each, formed out of loop 24 by a further slit (not shown) diametrically opposite slit 25, such connections being of transitional form and the secondary loop being arranged for the axis of the cylinder which they define to coincide with the delay-line at the unit.

What we claim is:

1. An electromagnetic transducer unit for a magnetostrictive delay-line to carry signals in the longitudinal mode, the line being of ribbon form in the vicinity of the unit, including two comparatively narrow flattened conductive transducer elements spaced apart to allow the ribbon of the delay-line to pass transversely between them with its broader surfaces closely parallel to the broader surfaces of those elements, two comparatively broad transformer secondary components each formed by a half-loop of conductive strip material disposed so that the two define together a cylinder the diameter of which is approximately equal to the breadth of each strip and the axis of which is parallel to the direction of the delay-line in the vicinity of the unit, a pair of closely-parallel planar connections joining the ends of the transducer elements on one side of the delay-line to ends adjacent to one another of the secondary components, each to each, over a transitional region of length approximately equal to half the breadth of said strip material, these connections being shaped at their edges for smoothly converging the sectional dimensions of said ends of the secondary components to the sectional dimensions of said ends of the transducer elements, a primary winding closely coupled inductively to the two secondary components, and secondary-circuit completion connections so applied to the other ends of the transducer elements and the other ends of the secondary components as to allow the primary winding to energise in respect of each transducer element a secondary circuit to cause that element to carry a current which at any given moment flows transversely to the delay-line in the opposite direction to the current carried by the other element at that moment, thereby providing the effect of an energised transducer loop.

2. A transducer unit as claimed in claim 1 wherein the axis of said cylinder is displaced from the delay-line and said completion connections include a direct connection between said other ends of the transducer elements, thereby causing them to form a transducer loop, and a direct connection between said other ends of the secondary components, thereby causing them to form a secondary loop in series with the transducer loop.

3. A transducer unit as claimed in claim 1 wherein the axis of said cylinder is coincident with the delay-line in the vicinity of the unit and said completion connections include a further pair of closely-parallel planar connections similar to said first-mentioned pair but joining said other ends of the transducer elements to said other ends of the secondary components, each to each, over a further transitional region similar to said first-mentioned region, thereby causing each secondary component to form a secondary half-loop in series with one of the transducer elements.

4. An electromagnetic transducer unit for a magnetostrictive delay-line to carry signals in the longitudinal mode, the line being of ribbon form in the vicinity of the unit, including two transformer secondary components each formed by a half-loop of conductive strip material located so that the two define together a cylinder having a diameter approximately equal to the breadth of each strip and disposed around the delay-line, for each of said components a planar conductive transducer element which is narrow compared with the breadth of said strip, a connection joining one end of the element to one end of the component over a transitional region of length approximately equal to half the breadth of said strip, this connection being shaped at its edges for smoothly converging to one another the sectional dimensions of said ends, a like connection joining the other ends of the element and the component, both said connections and the element being coplanar and located closely parallel to the common diametral plane defined by the ends of both secondary components, and a primary winding closely coupled inductively to the two secondary components, the two transducer elements being disposed to provide for the delay-line the effect of an energised transducer loop when the primary winding is energised.

5. A transducer unit as claimed in claim 4 wherein each secondary component is formed in one piece with the associated transducer element and the transitional connections between them.

6. A transducer unit as claimed in claim 5 wherein each secondary component and the associated transducer element and transitional connections are formed by a plating and etching process on flexible plastic material.

References Cited by the Examiner
UNITED STATES PATENTS
3,173,109   3/1965   Parke _____ 333—7

ELI LIEBERMAN, *Primary Examiner.*

M. NUSSBAUM, *Assistant Examiner.*